United States Patent
Von Der Heide

(10) Patent No.: US 7,059,212 B2
(45) Date of Patent: Jun. 13, 2006

(54) ARRESTABLE TENSIONING DEVICE, IN PARTICULAR FOR A PARKING BRAKE SYSTEM

(75) Inventor: Johann Von Der Heide, Schramberg (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 10/909,629

(22) Filed: Aug. 2, 2004

(65) Prior Publication Data

US 2005/0000312 A1    Jan. 6, 2005

Related U.S. Application Data

(63) Continuation of application No. PCT/EP03/01129, filed on Feb. 5, 2003.

(30) Foreign Application Priority Data

Feb. 5, 2002 (DE) ............... 102 04 625

(51) Int. Cl.
F16C 1/22 (2006.01)

(52) U.S. Cl. .................... 74/501.5 R; 74/537

(58) Field of Classification Search ........... 74/501.5 R, 74/527, 530, 537
See application file for complete search history.

(56) References Cited

U.S. PATENT DOCUMENTS 4,058,271 A * 11/1977 Ubukata et al. ......... 242/383.4
5,269,195 A    12/1993 Kitagawara ............... 74/411.5

FOREIGN PATENT DOCUMENTS

| DE | 197 51 659 | 6/1999 |
|---|---|---|
| DE | 198 34 075 | 2/2000 |
| EP | 0 891 902 | 1/1999 |

* cited by examiner

*Primary Examiner*—Chong H. Kim
(74) *Attorney, Agent, or Firm*—MacMillan, Sobanski & Todd, LLC

(57) ABSTRACT

An arrestable tensioning device 10, in particular for a parking brake system, is described. The tensioning device 10 comprises an actuating device 20, a tensioning element 40 coupled to the actuating device 20 for executing a tensioning motion, and a releasable arresting device 60 for the tensioning element 40. The arresting device 60 has a first contour 70 coupled to the tensioning element 40, as well as an arresting element 66, which for arresting the tensioning element 40 interacts with the first contour 70, i.e. for example, is brought into engagement with the first contour 70. A lagging element 64 is provided, which upon a reversal of motion of the first contour 70 follows on after a time delay and in said case is movable relative to the first contour 70 back and forth between a first relative position enabling e.g. an engagement of the arresting element 66 into the first contour 70 and a second relative position preventing an engagement of the arresting element 66 into the first contour 70.

21 Claims, 3 Drawing Sheets

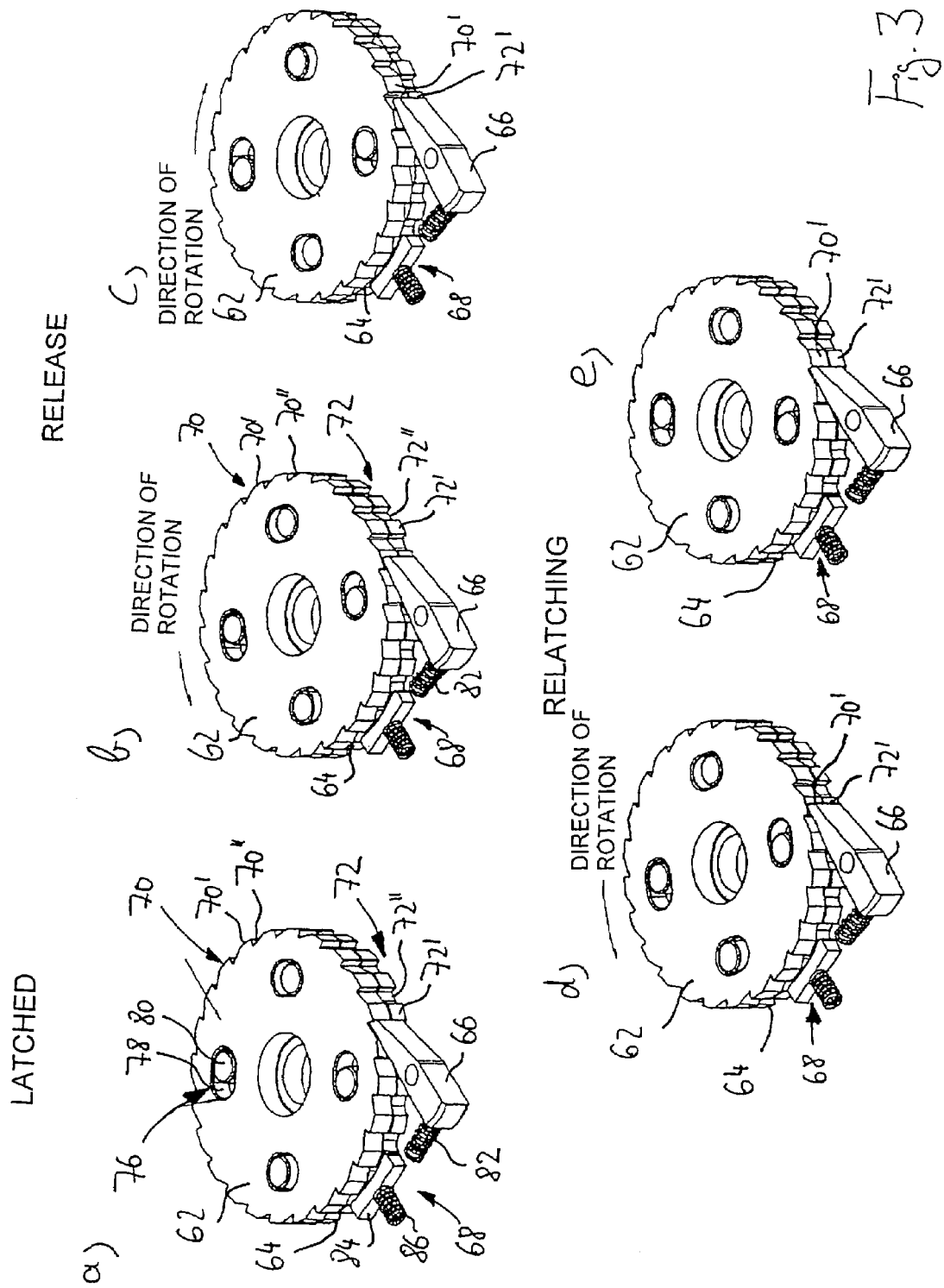

US 7,059,212 B2

ARRESTABLE TENSIONING DEVICE, IN PARTICULAR FOR A PARKING BRAKE SYSTEM

CROSS REFERENCE TO RELATED APPLICATIONS

This application is a continuation of International Application No. PCT/EP03/01129 filed Feb. 5, 2003, the disclosures of which are incorporated herein by reference, and which claimed priority to German Patent Application No. 102 04 625.5 filed Feb. 5, 2002, the disclosures of which are incorporated herein by reference.

BACKGROUND OF THE INVENTION

The invention relates to an arrestable tensioning device having an actuating device, a tensioning element coupled to the actuating device for executing a tensioning movement, and a releasable arresting device for the tensioning element, which arresting device comprises a first contour coupled to the tensioning element and an arresting element, which for arresting the tensioning element interacts with the first contour.

Such a tensioning device is known from DE 197 51 659. The tensioning device described there is part of a parking brake system and is used to tension brake pull cables of the parking brakes. The known tensioning device has an actuating device, which is actuable by means of an electric motor or muscular power. The actuating device enables a swivelling or rotating of a tensioning element, which is designed as a roller segment and coupled to the brake pull cables. The external contour of the roller segment is a ratchet mechanism and interacts with a spring-loaded detent pawl, which is pivotally mounted on the vehicle body.

For actuation of the parking brake system, the actuating device swivels the roller segment with simultaneous rolling-up of the pull cable. The roller segment in said case rotates in clockwise direction without being hindered by the adjacent, but non-locking detent pawl. In the arrested state, on the other hand, the roller segment is supported in an anticlockwise direction on the vehicle body by means of the ratchet mechanism and the detent pawl.

In order to release the parking brake, a second actuating device in the form of a hand lever is operated, which is coupled by means of a release cable to the detent pawl. The effect of operating the hand lever is that the detent pawl clears the ratchet mechanism of the roller segment. The freed roller segment rotates in anticlockwise direction under the tension of the brake pull cables.

SUMMARY OF THE INVENTION

The underlying object of the invention is to indicate an arrestable tensioning device, e.g. for a parking brake system, which device has an advantageous release mechanism. A further underlying object of the invention is to indicate a suitable method of operating such a tensioning device.

According to the invention, it is proposed to provide a tensioning device of the initially described type with a lagging element, which upon a reversal of motion of the first contour follows on after a time delay and in said case is movable relative to the first contour back and forth between a first relative position enabling an interacting of the arresting element with the first contour and a second relative position preventing an interacting of the arresting element with the first contour. The first contour may be formed either on the tensioning element itself or on an element, which is coupled to the tensioning element preferably such as to take up force.

The position of the lagging element relative to the first contour has an influence upon whether or not the arresting element may interact e.g. in a latching or rubbing manner with the first contour. If the lagging element in the second relative position prevents an interaction (i.e. for example, an engagement of the arresting element into the first contour), it simultaneously enables a release of the tensioning device. On the other hand, the lagging element in the first relative position allows an interaction (e.g. the engagement of the arresting element into the first contour) and hence an arresting of the tensioning device.

For switching over between the two relative positions, control means may be provided. For example, it is conceivable, as control means, to use a further, separate actuating device to move the lagging element relative to the first contour and hence back and forth between the first and the second relative position. Preferably, however, the switching-over is initiated by the actuating device provided for actuating the tensioning element. In said case, therefore, one and the same actuating device enables both the tensioning and the release of the tensioning device, thereby making it possible to dispense with a separate release device such as e.g. the hand lever known from the background art.

Widely differing developments of the control means are conceivable, which allow both the tensioning and the release of the tensioning device to be effected by one and the same actuating device. For example, the control means may comprise at least two components, namely, on the one hand, a driver and, on the other hand, two stops for the driver, which define the two relative positions. Advantageously, a first of these components is coupled rigidly to the lagging element and a second of these components is coupled rigidly to the tensioning element and/or the first contour. The two stops and the driver interacting with the stops define a specific play between the lagging element and the tensioning element and/or the first contour and therefore enable the delayed follow-on of the lagging element. Other mechanical solutions are however also conceivable, which lead to such a play between the lagging element and the tensioning element and/or the first contour.

The delayed follow-on of the lagging element is advantageously assisted by a delay device, which has a braking effect upon the lagging element. The delay device may be designed e.g. as a friction element. For example, it is possible to provide a delay element with a friction body biased towards the lagging element. In the simplest case, the friction element may however also be formed by a housing wall interacting with the lagging element. The regions of the housing wall that interact with the lagging element may additionally be subjected to a surface treatment such as e.g. roughening or the application of a coating, which increases the friction. If the lagging element has a sufficiently high mass inertia, it is possible even to dispense with the delay element.

According to an advantageous development of the invention, there is formed on the lagging element a second contour, against which the arresting element is supported in the second relative position, in which an interacting of the arresting element with the first contour is prevented. This second contour may at least in sections have an identical or similar shape to the first contour. It is moreover possible to dispose the lagging element and hence the second contour relative to the first contour in such a way that the arresting element at least in one of the two relative positions may interact simultaneously with the first contour and with the second contour formed on the lagging element. In said case, the position of the second contour relative to the first contour dictates whether or not the arresting element may interact with the first contour.

The first contour may have a smooth or rough shape or the shape of a tooth system, preferably of a ratchet mechanism. The first contour is advantageously of a linearly movable or rotationally movable or pivotable design. Preferably, the lagging element has the same shape as the element carrying the first contour. So, if the first contour is formed e.g. on a linearly movable gear rack, then the lagging element may also have the shape of a gear rack.

The arresting element, which for arresting purposes interacts with the first contour, may be designed as a friction structure or detent pawl, which may be biased towards the first contour. Preferably, the detent pawl at least in the second relative position is biased towards the second contour formed on the lagging element and the first contour is designed in such a way that the detent pawl may be brought into engagement with the first contour.

The arresting element interacts with the first contour or with both the first and the second contour advantageously in a self-arresting manner in the sense that it allows a movement in the one direction but prevents a movement in the other, opposite direction. Such a self-arresting design of the arresting device is particularly advantageous when both the tensioning and the release of the tensioning device is to be effected by means of one and the same actuating device. In said case, it is conceivable, for release of the arrested tensioning device, to actuate the tensioning element by means of the actuating device initially for a short time still in tensioning direction and then allow a reversal of motion in release direction, with the result that the lagging element is moved into the second relative position. In the second relative position, the lagging element prevents an interacting of the arresting element with the first contour.

After the release of the tensioning device, a fresh tensioning operation may be initiated by operating the actuating device in tensioning direction, i.e. counter to release direction. This reversal of motion in tensioning direction occasioned by the actuating device causes the lagging element to adopt the first relative position. In the first relative position, the arresting element may interact once more with the first contour.

Other advantages of this invention will become apparent to those skilled in the art from the following detailed description of the preferred embodiment, when read in light of the accompanying drawings.

BRIEF DESCRIPTION OF THE DRAWINGS

FIGS. 3*a–e* diagrammatic views of the mode of operation of an arresting device of the tensioning device illustrated in FIGS. 1 and 2.

DETAILED DESCRIPTION OF THE INVENTION

An embodiment of a tensioning device according to the invention designed for a parking brake system is described in detail below with reference to FIGS. 1, 2 and 3*a–e*.

The tensioning device according to the invention is however universally usable and suitable, in particular, also for use in connection with restraint systems and electromotive service brakes (EMB). It should moreover be noted that, although the following is a description of a rotational tensioning movement in connection with the take-up of a belt, the invention likewise includes linear or swivelling tensioning movements.

Figure 1:
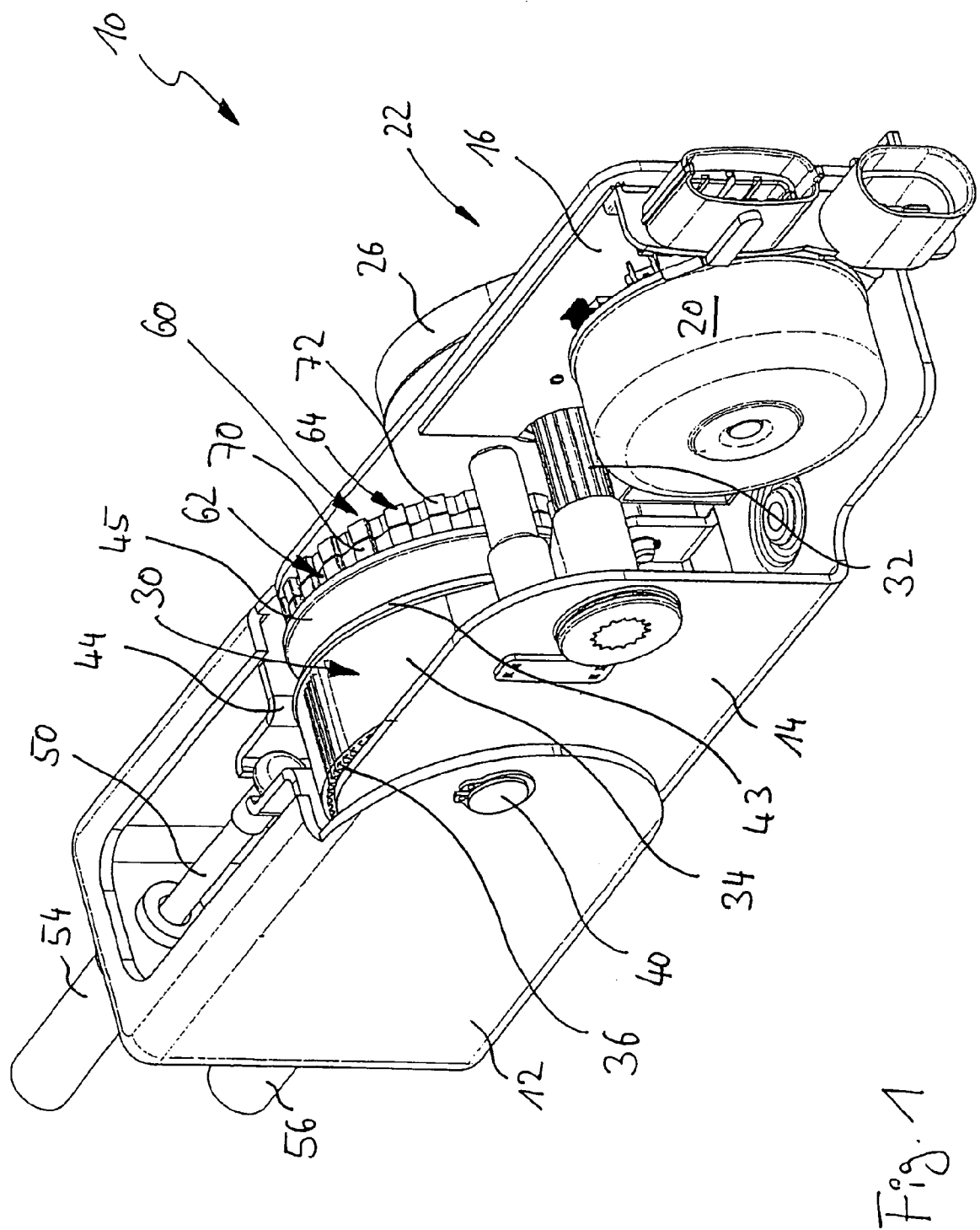
FIG. 1 a first view of a tensioning device according to the invention for a parking brake system.

In FIG. 1 a tensioning device 10 for a parking brake system is illustrated by way of example. The tensioning device 10 comprises a housing made of two parts 12, 14. A printed-circuit board (PCB) 16 is accommodated inside the housing. The printed-circuit board 16 carries a brushless stepping motor 20 as well as an electric control unit (ECU), which is not shown in FIG. 1, for the stepping motor 20.

In the embodiment, the stepping motor 20 operates as the (single) actuating device, which allows both a tensioning and a release of the tensioning device 10. In principle, actuating devices operable by muscular force or in some other way might alternatively or additionally be used. It would moreover be conceivable to use the actuating device shown in FIG. 1, i.e. the stepping motor 20, merely for tensioning and provide a separate actuating device, which is not shown in FIG. 1, for release purposes.

Connected functionally downstream of the stepping motor 20 illustrated in FIG. 1 is a two-step gear unit, which is described in detail below with reference to a combination of FIGS. 1 and 2. The two-step gear unit comprises a first gear step in the form of a reduction thread 22 designed as a belt drive and having a small gear wheel 24, which is driven by an output shaft of the stepping motor 20 and interacts by means of a belt 26 with a larger gear wheel 28. The second gear step 30 is designed like the first gear step 22 and comprises a small gear wheel 32, which is identical with the shaft of the large gear wheel 28 of the first reduction gear 22 and which interacts by means of a belt 34 with a larger gear wheel 36. Each of the two gear steps 22, 30 has a reduction ratio of 1:5. The resulting reduction ratio is accordingly 1:25. As the stepping motor 20 takes 28 steps per revolution, one step of the stepping motor 20 corresponds to a rotation of a shaft 40, which is coupled to the large gear wheel 36 of the second gear step 30, of approximately 0.50.

The shaft 40 coupled by means of the two gear steps 22, 30 to the stepping motor 20 operates as a tensioning element and, upon actuation of the stepping motor 20 in tensioning direction, executes a rotational tensioning motion. As a result of this rotational tensioning motion, a belt 42 coupled in a rotationally locked manner to the shaft 40 is wound onto the shaft 40. As a guide for the belt 42 two mutually parallel circular pulleys are provided, which are connected in a rotationally locked manner to the shaft 40 and surround the belt 42 on both sides. The belt 42 is coupled in tensioning direction, i.e. in FIG. 1 to the right and in FIG. 2 to the left, to a cable bridge 44, which is guided linearly inside the housing portion 12. The cable bridge 44 has one receiver 46, 48 each for a left and a right brake pull cable 50, 52. The two brake pull cables 50, 52 lead via corresponding cable guides 54, 56 to parking brakes, which are not shown in the drawings.

Figure 2:
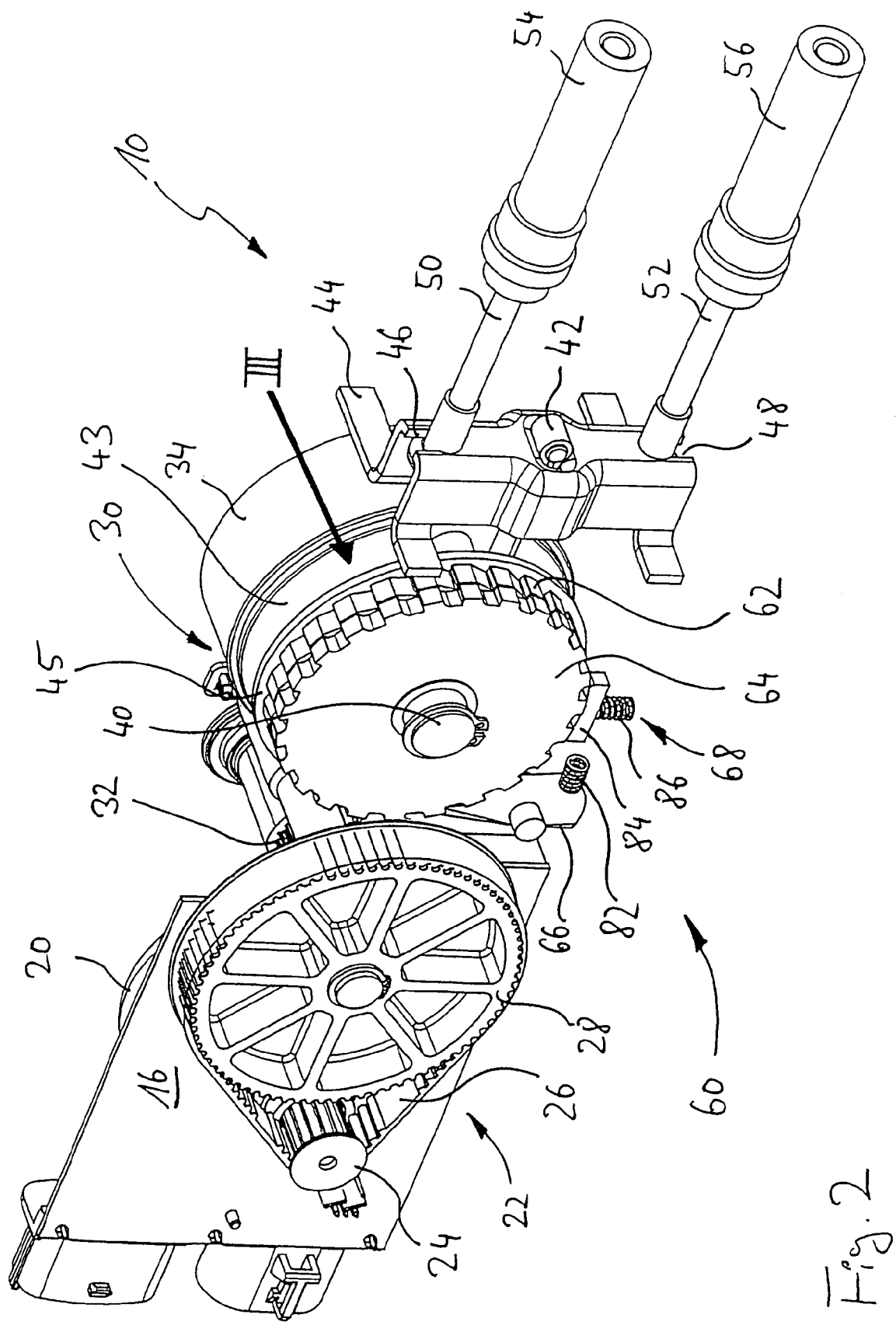
FIG. 2 a second view of the tensioning device according to FIG. 1.

A central component of the tensioning device 10 illustrated in FIGS. 1 and 2 is a releasable arresting device 60, which is described in detail below with additional reference to FIGS. 3*a–e*. FIGS. 3*a–b* show a view of the arresting device 60 in the direction of the arrow III in FIG. 2.

The arresting device 60 illustrated in FIGS. 1, 2 and 3*a–e* comprises two mutually parallel disks 62, 64, which are concentrically penetrated by the shaft 40 and of which an inner disk 62 is applied flat against one of the guide pulleys for the belt 42, as well as an arresting device in the form of a detent pawl 66 and a delay device 68 in the form of a friction element. The, in relation to the shaft 40, inner disk 62 of the arresting device 60 is coupled in a rotationally locked manner to the shaft 40 and radially at the outside has a toothed contour 70 in the form of stub saw teeth. This means that the contour 70 in peripheral direction has alternating plateau-like portions 70' and recesses 70" in the shape of right-angled triangles.

The outer disk 64, which is disposed further out on the shaft 40 than the inner disk 62, is identical in shape to the inner disk 62. Unlike the inner disk 62, however, the outer disk 64 is mounted with play on the shaft 40. This means that the outer disk 64 is rotatable by a defined angular range relative to the shaft 40 and the inner disk 62 connected in a rotationally locked manner to the shaft 40, i.e. lags behind the inner disk 62 in a defined manner.

The defined angular range is selected in the following way. Like the inner disk 62, the outer disk 64 also has a toothed external contour 72 having recesses 72" of a substantially rectangular cross section and having plateau-like portions 72'. The length in peripheral direction of the plateau-like portions 72' of the outer disk 64 corresponds substantially to the length of the plateau-like portions 70' and recesses 70" of the inner disc 62. The limited angle of rotation of the outer disk 64 relative to the inner disk 62 is then selected in such a way that the play of the outer disk 64 relative to the inner disk 62 in peripheral direction of the two disks 62, 64 corresponds approximately to twice the plateau length.

The end points of the play between the outer disk 64 and the inner disk 62 are selected in such a way that in a first relative position the plateau-like portions 72' of the outer disk 64 are disposed congruently with the plateau-like portions 70' of the inner disk 62 (FIG. 3*b*) and in a second relative position the plateau-like portions 72' of the outer disk 64 are disposed exactly between two plateau-like portions of the inner disk 62, i.e. in the region of the recesses 70", (FIG. 3*c*). For switching over between these two relative positions, control means 76 are provided. The control means 76 comprise, on the one hand, a plurality of pin-like drivers 78, which run parallel to the axis of the shaft 40 and extend from a surface of the outer disk 64 facing the inner disk 62 in the direction of the inner disk 62. The drivers 78 engage in each case into an oblong hole 80 formed in the surface of the inner disk 62. The total of four oblong holes 80 formed in the inner disk 62 operate as the components of the control means 76 that are complementary to the drivers 78.

The two opposite short sides of the oblong holes 80 each form a stop for the driver 78 guided in the respective oblong hole 80. The oblong holes 80 therefore, on the one hand, delimit the angular range of rotation of the outer disk 64 relative to the inner disk 62 and, on the other hand, define the previously described stops, i.e. the positions of the first and of the second relative position between inner disk 62 and outer disk 64.

The control means 76 in the form of drivers 78 engaging into oblong holes 80 and described with reference to FIGS. 1, 2 and 3*a*–*e* are to be understood as merely an exemplary development of the control means. Another development of the control means might, for example, be such that in the shaft 40 a groove is formed, which extends round a limited angular range in peripheral direction and into which a pin-like element coupled to the outer disk 64 engages. As the groove is formed only over a specific angular range, it comprises two stops, which are spaced apart in peripheral direction and interact with the pin-like element in order to define a limited play between the outer disk 64 and the shaft 40. It might moreover be conceivable to use, as control means, a further actuating device such as e.g. a servomotor, which allows a switchover of the outer disk 64 relative to the inner disk 62 between the two relative positions. The arresting device 60 illustrated in FIGS. 1, 2 and 3*a*–*e* comprises in addition to the two disks 62, 64 the lever-like detent pawl 66, which is biased by a spring 82 towards the contours 70, 72 of the disks 62, 64. The detent pawl 66 interacts in a self-arresting manner with the contour 70 of the inner disk 62. This means that in the first relative position, upon a movement of the inner disk 62 in tensioning direction, the detent pawl 66 latches in such a way into the recesses 70" of the contour 70 that the present tension is held. In said case, the detent pawl 66 interacts with the inner disk 62 in such a way that it takes up force. In other words, the instantaneous tension, which in the embodiment is introduced as torque into the shaft 40, is introduced from the shaft 40 to the inner disk 62 coupled in a rotationally locked manner to the shaft 40, from the inner disk 62 to the detent pawl 66, and from the detent pawl 66 into the vehicle body.

Besides the two disks 62, 64 and the detent pawl 66, the arresting device 60 comprises the already mentioned delay device 68, which interacts in a braking manner with the outer disk 64 designed as a lagging element. In the embodiment, the delay device 68 comprises a friction body 84, which is biased by a spring 86 towards the outer disk 64 or, more precisely, towards the external contour 72 of the outer disk 64. The delay element 68 results in a specific inertia of the outer disk 64 relative to a movement of the inner disk 62. The inertia in turn is responsible for the previously described switchover between the two relative positions of inner disk 62 and outer disk 64.

The delay device 68 may be arranged offset by 90° relative to the representation in the drawings so that it interacts, not with the external contour 72 of the outer disk 64, i.e. with the end thereof, but with the surface of the outer disk 64 remote from the inner disk 62. Alternatively, the outer disk 64 might interact directly with the inner wall of the second housing portion 14 (FIG. 1) in such a way that the friction between the surface of the outer disk 64 facing the housing portion 14 and the housing portion 14 brakes the outer disk 64. In said case, the second housing portion 14 would operate as the delay device.

Given a sufficiently high mass inertia of the outer disk 64, the delay device 68 might even be dispensed with entirely. To increase the mass inertia of the outer component 64, it is conceivable to increase the disk thickness or manufacture the disk from a material of high density.

The mode of operation of the tensioning device 10 according to the invention illustrated in FIGS. 1 and 2 is described in detail below with reference to FIGS. 3*a*–*e*. In said case, it is assumed that the parking brakes are in the applied state. This means that the belt 42 is wound to the greatest extent onto the shaft 40 and the shaft 40 is loaded with a high torque corresponding to the tensile force. The high torque is taken up by the arresting device 60, which is in the arrested state. In the arrested state, the detent pawl 66 is in latching engagement into both one of the recesses 70" of the inner disk 62 and one of the recesses 72" of the outer disk 64. The outer disk 64 operating as a lagging element is therefore situated in the previously described first relative position relative to the inner disk 62. This state is shown in FIG. 3*a*.

In order to release the arresting device 60 and hence the tensioning device 10, the stepping motor 20 is then actuated in such a way that the shaft 40 moves slightly further in tensioning direction. By tensioning direction is meant the direction that effects further winding of the belt 42 onto the shaft 40. As is shown in FIG. 3b, the further rotation of the shaft 40 in tensioning direction is effected only until the detent pawl 66 is lifted out of its latching into the recesses 70", 72" of the two disks 62, 64 and comes to lie on the immediately adjacent plateau-like portions 70', 72'. The outer disk 64 is immediately seized by the rotation of the inner disk 62 out of the position according to FIG. 3a into the position according to FIG. 3b because the drivers 78 already lie against the stops of the oblong holes 80 associated with the tensioning motion. This means that the outer disk 64 remains relative to the inner disk 62 in the relative position enabling an engagement of the detent pawl 66 into the contour 70.

This changes however as soon as the inner disk 62, as shown in FIG. 3c, experiences a reversal of motion, i.e. is moved counter to the tensioning direction. Upon the reversal of motion of the inner disk 62 from the tensioning direction according to FIG. 3b into the, in relation to the tensioning direction opposite, release direction according to FIG. 3c, the outer disk 64 namely initially remains in the original position because of the inertia artificially generated by means of the delay device 68, while the inner disk 62 is already moving slightly in release direction. The outer disk 64 is seized by the movement of the inner disk 62 in release direction only after the oblong holes 80 formed in the inner disk 62 have moved relative to the drivers 78 to such an extent that the drivers 78 then interact with the opposite stops of the oblong holes 78. It is only from this point on that the outer disk 64 is seized by the movement of the inner disk 62 in release direction.

The initial relative movement between outer disk 64 and inner disk 62 is accompanied by a relative displacement of the contours 70, 72 associated with the respective disks 62, 64. In the relative position between outer disk 64 and inner disk 62 illustrated in FIG. 3c, the plateau-like portions 72' of the outer disk 64 are disposed exactly in the region of the recesses 70" of the inner disk 62. An engagement of the detent pawl 66 into the recesses 70" of the contour 70 of the inner disk 62 is therefore prevented. In other words, in the second relative position the detent pawl 66 is supported against the plateau-like portions 72' of the outer disk 64 and is consequently prevented from latching into the recesses 70" of the contour 70 of the inner disk 62. Under the tension of the brake pull cables 50, 52 the shaft 40 may then rotate in release direction, resulting in release of the parking brakes.

Should a fresh actuation of the parking brakes be necessary after a specific time, the stepping motor 20 is reactivated in such a way that the shaft 40 rotates in tensioning direction. This corresponds to a reversal of motion, because the shaft 40 (occasionally, some time before) has rotated in release direction. As a result of the inertia of the outer disk 64, the outer disk 64 initially remains stationary for a short time, while the inner disk 62 is already moving in tensioning direction again. It is only after the oblong holes 80 have moved relative to the drivers 78 coupled to the outer disk 64 to such an extent that the drivers 78 have moved in tensioning direction into abutment with the opposite stops of the oblong holes, that the outer disk 64 is seized by the movement of the inner disk 62 in tensioning direction, i.e. it is only from this point on that the outer disk 64 follows the inner disk 62.

As may be gathered from FIG. 3d, at this instant the outer disk 64 readopts, relative to the inner disk 62, the first relative position enabling an engagement of the detent pawl 66 into the recesses 70" of the inner disk 62. The detent recesses 70" are therefore cleared once more. As is shown in FIG. 3e, the detent pawl 66 may therefore move back into latching engagement with the recesses 70", 72" of the inner disk 62 and the outer disk 64. Because of the self-arresting design of the arresting device 60, the drive may be stopped, i.e. the stepping motor 22 may be disconnected, as soon as the necessary tension has been achieved. As a measure of the achieved tension, the power consumption of the stepping motor 22 may be used.

As the shaft 40 in the previously described embodiment executes a rotational tensioning movement for take-up of the belt 42, the arresting device 60 was provided with disk-like gear wheels 62, 64. An identical kind of functionality may however be achieved e.g. by means of two linearly movable gear racks, the contours of which correspond to the contours 70, 72 described with reference to FIG. 3a. Such a modification of the arresting device 60 would be meaningful especially with a linearly moved tensioning element 40. It should moreover be noted that, instead of the toothed contours 70, 72, it might in principle be possible also to use more or less flat contours, i.e. for example, smooth or roughened contours. In this case, the interacting between the arresting element and these contours might be effected by friction locking.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An arrestable tensioning device for a parking brake system, comprising:
   an actuating device;
   a tensioning element coupled to the actuating device for executing a tensioning motion;
   a releasable arresting device for the tensioning element, which arresting device comprises a first contour coupled to the tensioning element for movement therewith and an arresting element adapted to interact with the first contour for arresting the tensioning element;
   a lagging element movable relative to the first contour back and forth between a first relative position enabling an interaction of the arresting element with the first contour and a second relative position preventing an interaction of the arresting element with the first contour; wherein, upon a reversal of motion of the first contour, the lagging element follows said motion of the first contour after a delay in which the lagging element switches from one of said two relative positions to the other of said two relative positions; and
   wherein a delay device is provided, which interacts in a braking manner with the lagging element.

2. The tensioning device according to claim 1, wherein a control part is provided for switching over between the two relative positions.

3. The tensioning device according to claim 2, wherein the control part defines a limited play between the lagging element and the first contour.

4. The tensioning device according to claim 3, wherein the control part comprises at least two components, namely, on the one hand, a driver and, on the other hand, two stops for the driver, which define the two relative positions, wherein a first of the components is coupled rigidly to the lagging element and a second of the components is coupled rigidly to the tensioning element or the first contour.

5. The tensioning device according to claim 1, wherein the lagging element has a sufficiently high mass inertia to thereby operate as the a delay device.

6. The tensioning device according to claim 1, wherein the delay device comprises a friction element.

7. The tensioning device according to claim 1, wherein there is formed on the lagging element a second contour, against which the arresting device is supported in the second relative position.

8. The tensioning device according to claim 1, wherein the first contour is formed on the tensioning element itself or on an element coupled to the tensioning element in such a way as to take up force.

9. The tensioning device according to claim 1, wherein at least the first contour is a tooth system.

10. The tensioning device according to claim 1, wherein at least the first contour is of a rotationally movable or pivotable design.

11. The tensioning device according to claim 1, wherein the arresting element has a detent pawl, which may be biased towards the first contour.

12. The tensioning device according to claim 1, wherein the arresting device is of a self-arresting design and both the tensioning and the release of the tensioning device is effected by means of the actuating device.

13. A tensioning device comprising:
an actuating arrangement;
a tensioning element coupled to the actuating arrangement and operable to execute a tensioning motion;
a releasable arresting arrangement comprising a coupling element rigidly connected to the tensioning element and an arresting element, which interacts with the coupling element for arresting the tensioning element;
a lagging element, which upon a reversal of motion of the coupling element lags behind said motion and is moveable relative to the coupling element back and forth between a first relative position enabling an interaction of the arresting element with the coupling element and a second relative position preventing such an interaction; and
wherein a delay device is provided, which interacts in a braking manner with the lagging element.

14. A parking brake system comprising:
a brake pull cable; and
a tensioning device coupled to the brake pull cable, the tensioning device including:
a tensioning element coupled to the brake pull cable for executing a tensioning motion;
a releasable arresting device for the tensioning element, which arresting device comprises a contour coupled to the tensioning element for movement therewith and an arresting element, which interacts with the contour for arresting the tensioning element; and
a lagging element movable relative to the contour back and forth between a first relative position enabling an interaction of the arresting element with the contour and a second relative position preventing an interaction of the arresting element with the contour; wherein upon a reversal of motion of the contour, the lagging element follows said motion of the contour after a delay in which the lagging element switches from one of said two relative positions to the other of said two relative positions.

15. A method of operating an arrestable tensioning device comprising the steps of:
providing an actuating arrangement;
providing a tensioning element coupled to the actuating arrangement and operable to execute a tensioning motion;
providing a releasable arresting arrangement having a contour rigidly coupled to the tensioning element and an arresting element, which interacts with the contour for arresting the tensioning element;
providing a lagging element, which upon a reversal of motion of the contour lags behind said motion and is moveable relative to the contour back and forth between a first relative position enabling an interaction of the arresting element with the contour and a second relative position preventing such an interaction, wherein for a release of the tensioning device the tensioning element is actuated from an arrested state by a defined distance further in a tensioning direction and then counter to the tensioning direction; and
wherein a delay device is provided, which interacts in a braking manner with the lagging element.

16. The tensioning device according to claim 13, wherein the lagging element has a sufficiently high mass inertia to thereby operate as the delay device.

17. The tensioning device according to claim 13, wherein the delay device comprises a friction element.

18. The tensioning device according to claim 14, wherein the lagging element has a sufficiently high mass inertia to thereby operate as the delay device.

19. The tensioning device according to claim 14, wherein the delay device comprises a friction element.

20. The tensioning device according to claim 15, wherein the lagging element has a sufficiently high mass inertia to thereby operate as the delay device.

21. The tensioning device according to claim 15, wherein the delay device comprises a friction element.

* * * * *

UNITED STATES PATENT AND TRADEMARK OFFICE
CERTIFICATE OF CORRECTION

| | | |
|---|---|---|
| PATENT NO. | : 7,059,212 B2 | Page 1 of 1 |
| APPLICATION NO. | : 10/909629 | |
| DATED | : June 13, 2006 | |
| INVENTOR(S) | : Johann Von Der Heide | |

It is certified that error appears in the above-identified patent and that said Letters Patent is hereby corrected as shown below:

Column 9, Claim 5, Line 6, after "the" delete "a".

Signed and Sealed this

Twenty-ninth Day of August, 2006

JON W. DUDAS
*Director of the United States Patent and Trademark Office*